May 19, 1959  E. H. REID  2,887,618
VACUUM ARRANGEMENT
Filed Oct. 4, 1954  2 Sheets-Sheet 1
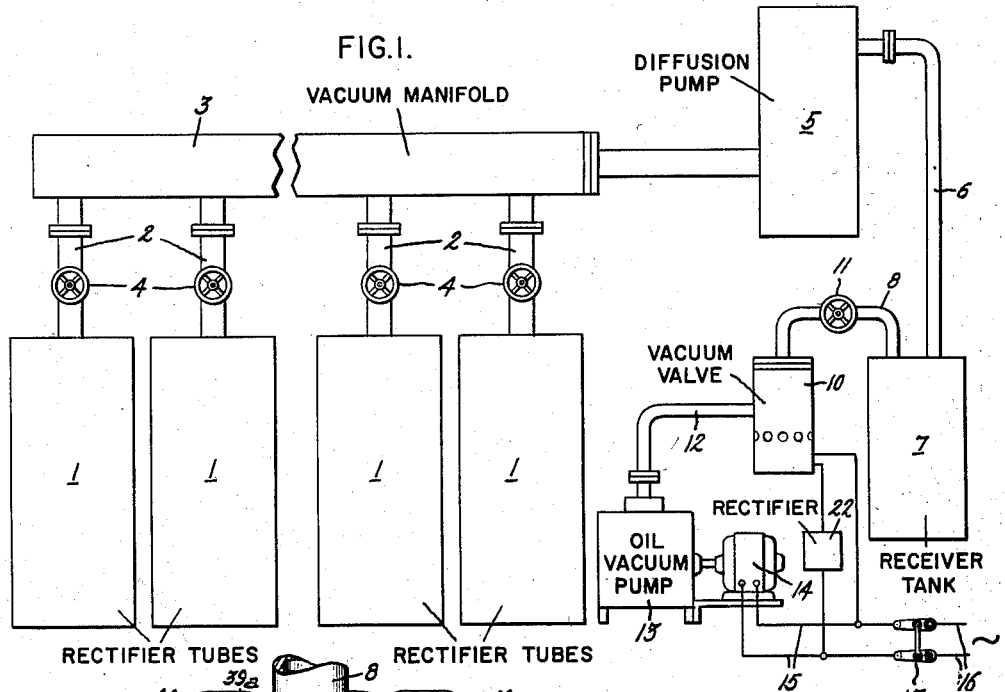
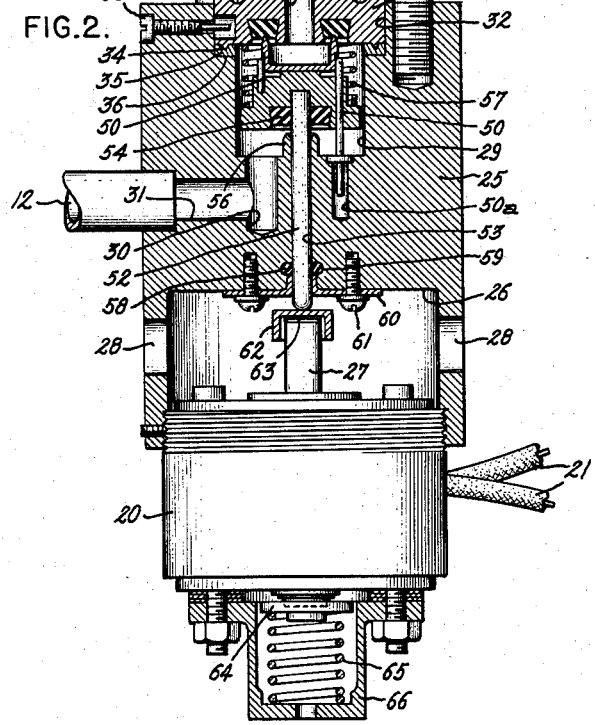
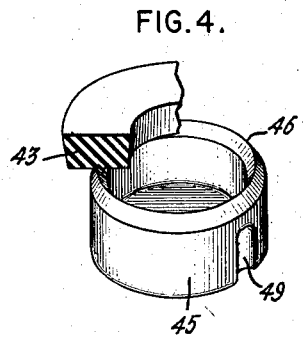
INVENTOR:
EUGENE H. REID,
BY Charles M. Hutchins
HIS ATTORNEY.

May 19, 1959 E. H. REID 2,887,618
VACUUM ARRANGEMENT
Filed Oct. 4, 1954 2 Sheets-Sheet 2

INVENTOR:
EUGENE H. REID,
BY Charles M. Hutchins
HIS ATTORNEY.

United States Patent Office 2,887,618
Patented May 19, 1959

2,887,618

VACUUM ARRANGEMENT

Eugene Harvey Reid, Schenectady, N.Y., assignor to General Electric Company, a corporation of New York Application October 4, 1954, Serial No. 459,891

12 Claims. (Cl. 315—108)

My invention relates to vacuum systems and pertains more particularly to a new and improved vacuum system and a new and improved automatic vacuum valve for use therein.

Many vacuum systems, such as pumped electronic discharge tube systems, rely upon diffusion pumping means, such as a mercury diffusion pump, to maintain the pressures in the vacuum sides of the systems within predetermined desired operating ranges. Operation of the diffusion pump is generally accomplished by connection of a rotary vacuum pump, or its mechanical equivalent, to the exhaust side of the diffusion pump. This rotary type of vacuum pump is generally referred to as an oil vacuum pump, since the presence of oil therein to provide seals between the moving parts is essential to its operation.

Now it will be seen that passage of oil vapor from the oil vacuum pump and leakage of air past the seals in the oil vacuum pump into the vacuum side of the system would contaminate the vacuum system. This cannot happen while the oil pump is operating at satisfactory operating speed; and, a valve is generally included in the system between the oil pump and the diffusion pump to prevent passage of fluids of any types into the vacuum system when the oil pump is idle. The valve is generally a solenoid controlled valve connected in the control circuit of the oil pump motor so as to close the connection between the pumps whenever, for any reason, the motor stops, and to open the connection upon restarting of the oil pump motor. Such an arrangement is generally satisfactory when only short periods of shutdown are encountered and while the motor and pump are in satisfactory operating conditions. That is, if the periods of shutdown are short the amount of air that may leak past the pump seals and the oil vapor which accumulates between the oil pump and valve will not be substantial and will be swept or cleared out by the oil pump substantially immediately upon restarting and will not enter the vacuum system. Additionally, if the oil pump and motor are operating satisfactorily they will be effective for accomplishing the just-mentioned sweeping out of air and oil vapor before the valve opens. However, if the shutdown period is of a long duration or if the oil pump and motor are not in satisfactory operating conditions, the air and oil vapor on the oil pump side of the system will be substantial and this portion of the system will not be evacuated before the solenoid valve opens the connection between the pumps; and, consequently, the air and oil vapor will pass into and contaminate the vacuum system.

Heretofore, various types of arrangements have been used in efforts to delay opening of the valve thereby to insure evacuation of the oil pump side of the system before the valve is opened. For example, valves operating on a dash-pot principle or including an electrical time delay have been employed to obtain a delay between motor starting and valve opening. Also, valves controlled by over-speed or governor types of devices were utilized. However, all of these devices proved expensive and, more importantly, did not insure against opening of the valve before the oil pump side of the system is sufficiently evacuated. That is, when dash-pot or electrical timed delayed valves were employed opening of the valves was delayed until a predetermined time following starting of the oil pump motor. However, these devices were incapable of insuring against opening of the valve in the event the pump was ineffective for evacuating the oil pump side of the system during the time between motor starting and valve opening owing to unsatisfactory operation of the pump or motor. The over-speed or governor controlled valves avoided opening of the connections between the pumps if the motor failed to attain operating speed, but these too were incapable of insuring against opening of the valve if for any reason the oil pump was ineffective for evacuating the oil pump side of the system between motor starting and valve opening. Accordingly, it is desirable to provide means for avoiding contamination of the vacuum system, by closing the connection between the oil pump and the remainder of the system upon stopping of the oil pump and to maintain the connection closed upon restarting until a predetermined pressure condition exists between the oil pump and the remainder of the system.

Additionally, in line with avoiding contamination of the vacuum side of the system it is desirable to provide a good seal between the valve member and valve seat when the valve is closed. To accomplish this it is desirable to avoid the accumulation of foreign matter, such as rust particles or the like, on the sealing surface of the valve member.

The primary object of my invention is to provide a new and improved vacuum system.

Another object of my invention is to provide a new and improved vacuum valve adapted for delayed opening until a predetermined pressure condition exists thereacross.

Another object of my invention is to provide in a vacuum system including an oil pump, a new and improved vacuum valve adapted for maintaining a connection between the pump and vacuum side of the system closed until the pump is effective for reducing the pressure on the pump side thereof to a predetermined value, thereby to avoid contamination of the vacuum system by any fluid that may have accumulated on the oil pump side of the valve.

Another object of my invention is to provide in a pumped rectifier system including a diffusion pump and an oil vacuum pump, a new and improved automatic vacuum valve for maintaining a connection between the pumps closed during restarting and until the oil pump is effective for reducing the pressure on the oil pump side of the valve to a predetermined value, thereby to avoid contamination of the vacuum system by any fluid that might have accumulated in the system between the oil pump and valve.

Another object of my invention is to provide a new and improved automatic valve including means adapted for avoiding accumulation of matter on the sealing surfaces thereof thereby to insure a satisfactory seal when the valve is closed.

Still another object of my invention is to provide a new and improved vacuum valve which is inexpensive and highly reliable in service.

Further objects and advantages of my invention will become apparent as the following description proceeds and the features of novelty which characterize my invention will be pointed out with particularity in the claims annexed to and forming part of this specification.

In carrying out the objects of my invention I provide a vacuum system including a valve having a valve sealing member and operating means for moving the sealing member into a valve closing position. The sealing member is adapted to remain in the valve closing position until a predetermined pressure condition exists across the sealing member. Additionally, the sealing surface of the sealing member is formed to avoid accumulation of matter thereon.

For a better understanding of my invention reference may be had to the accompanying drawing in which:

Fig. 1 is a schematic illustration of a pumped vacuum system incorporating my invention;

Fig. 2 is an enlarged sectional view of a vacuum valve constructed in accordance with my invention;

Fig. 4 is an enlarged perspective detail illustrating the sealing member and valve seat.

Figure 3:
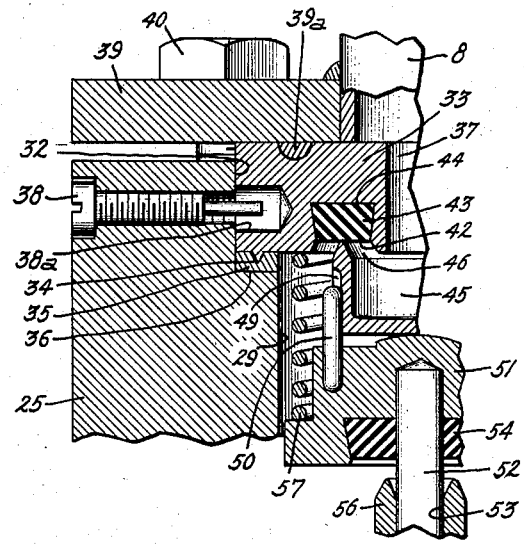
Fig. 3 is an enlarged fragmentary sectional view illustrating my invention in detail.

In Fig. 1 is illustrated a pumped ignitron rectifier system incorporating my invention and including a plurality of rectifier tubes 1 connected by a plurality of pipes or lines 2 to a vacuum manifold 3. Tubes 1 can be of any conventional type of pumped electron discharge device such as, for example, pumped ignitrons of the type designated No. 6981985 in the current catalog of the assignee of the present invention. It will, of course, be understood that this invention is not limited for use in evacuating tubes of this type, but as will appear, it is equally well adapted for use in any type of pumped vacuum system regardless of the nature of the components to be evacuated. Each of the lines 2 may include a manually operable valve 4 for controlling communication between its respective rectifier tube and the vacuum manifold. The manifold 3 is suitably connected to a mercury diffusion pump generally designated 5. The mercury diffusion pump 5 may be of any suitable type such as, for example, of the type designated No. 6993370 in the current catalog of the assignee of the present invention. My invention is not, of course, limited to this particular type of diffusion pump. In fact, diffusion pumps other than of the mercury type are alternatively employable in some vacuum systems in which my invention may be incorporated. The mercury diffusion pump 5 is adapted when operated for evacuating the rectifier tubes 1 through lines 2 and manifold 3, thereby to maintain the pressure in the rectifier tubes within a predetermined satisfactory operating range.

The exhaust side of the mercury diffusion pump 5 is connected by a pipe 6 to a receiver tank 7 adapted both for receiving any liquid mercury that might pass through the diffusion pump and for a purpose to be brought out in detail hereinafter. A pipe 8 connects the tank 7 with the inlet side of my new and improved automatic valve 10. A manually operable valve 11 is provided in the pipe 8 for controlling communication between the valve and the vacuum side of the system. The valve 11 permits closing off of the vacuum side of the system while repairs or replacement of components are carried out on the opposite side of the system. Another pipe 12 connects the outlet side of my valve 10 with an oil vacuum pump, generally designated 13 and including a drive motor 14. The oil vacuum pump may be of any suitable type and, by way of example only, may be a rotary vacuum pump of the type manufactured and sold by the W. M. Welch Scientific Company, of Chicago, Illinois, under catalog number 1400. The drive motor 14 may be of any type suitable for driving such a pump. The motor 14 is connected by a pair of leads 15 to a suitable alternating current power source 16, and is controlled by a switch 17.

When the switch 17 is closed and the motor 14 of the oil vacuum pump 13 is energized, the oil pump is normally effective for drawing a vacuum on the exhaust side of the mercury diffusion pump 5 through the valve 10 and the receiver tank 7 for operating the diffusion pump to evacuate the rectifier tubes 1 through the vacuum manifold 3, thereby to maintain the pressure in the tubes 1 within a predetermined satisfactory operating range.

The automatic valve 10 is adapted for controlling communication between the oil vacuum pump side of the vacuum side of the system in accordance with the operation of the oil pump. That is, the valve 10 is provided for closing the communication between the oil pump and the vacuum sides of the system when the oil pump is idle, and, upon restarting, until the oil pump is effective for evacuating the oil pump side of the system of fluid, thereby to avoid contamination of the vacuum side of the system, and more specifically the vacua of the tubes 1, by oil vapor from the oil pump.

As seen in Fig. 2 the valve 10 includes a solenoid 20. The solenoid 20, as shown in Fig. 1, is connected by leads 21 in the circuit of the motor 14, and connected in one of the leads 21 is a rectifier 22. Thus, the solenoid 20 is adapted for being energized whenever the switch 17 is closed and the motor 14 is operating and for being deneregized when the motor is rendered idle by opening of the switch 17 or a power failure. While I have shown the rectifier 22 in the valve circuit, indicating that the solenoid 20 is a D.C. solenoid, an A.C. solenoid could alternatively be utilized in which case the rectifier would not be needed.

With reference to Figs. 2 and 3, it will be seen that the valve 10 further includes a valve body portion or head 25 cast, or otherwise formed, to include a recess 26 in the lower end thereof. The lower end of the head 25 is adapted for having the upper end of the solenoid 20 suitably secured therein for thereby disposing the stem 27 of the solenoid in the recess 26. Additionally, the lower side portion of the valve head 25 is formed to include a plurality of circumferentially spaced bores 28 adapted for facilitating cooling, serving as lightening holes, and to provide access to the stem 27.

The upper end of the valve head 25 is formed to include an axially extending bore 29 adapted for serving as a valve chamber. Another downwardly extending bore 30 extending downwardly from the bottom of the bore 29 intersects a laterally extending bore 31 thereby to provide an outlet side of the chamber for connection to the pipe 12 adapted for connecting the valve to the oil vacuum pump 13. The upper end of the bore 29 is counterbored at 32 for receiving a flange insert 33. The insert 33 is formed to include downwardly extending bead 34 adjacent the periphery thereof for cooperating with a gasket 35 positioned on a shoulder 36 formed by the bore 29 and the counterbore 32. The flange insert 33 is formed to include a central bore or aperture 37 for constituting the inlet side of the valve 10. The flange insert 33 is adapted for being suitably retained in position during assembly of the valve by a suitable retaining pin 38, the end of which fits in a suitable bore 38a in the side of the insert 33. The insert 33 is adapted for being held down for pressing the bead 34 into the gasket 35 to effect sealing between the valve chamber and insert, by means of a flange 39 and cooperating hold-down bolts 40 suitably spaced about and threaded into the top of the valve head 25.

The flange 39 is formed with a central bore in which is welded the end of the pipe 11. A seal is effected between the insert 33 and the flange 39 by a circular gasket 39a formed of aluminum or the like. The gasket 39a is fitted in a suitable annular groove in the upper surface of the insert 33 during assembly of the valve and is suitably compressed by the flange 39 to effect a satisfactory seal by tightening of the flange hold-down bolts 40.

The flange insert 33 is further adapted for carrying the main valve seat of the structure, generally designated 42 in Fig. 3. The main valve seat 42 comprises an annular member 43 positioned and retained in an annular recess 44 formed in the underside of the insert 33 and concentric with the bore 37. The member 43 may be formed of any suitable resilient material, such as rubber or the like. In this arrangement the member 43 is removable and replaceable when worn or otherwise rendered unsatisfactory.

Provided for cooperating with the main valve seat 42 is a cupped or cup-like sealing member 45 formed as a relatively light element. That is, the member 45 can be formed of aluminum or some other relatively light material, or it could be formed of a heavier material such as stainless steel provided the walls are formed relatively thin. The purpose of this feature of the sealing member 45 will be brought out in more detail hereinafter.

Figure 5:
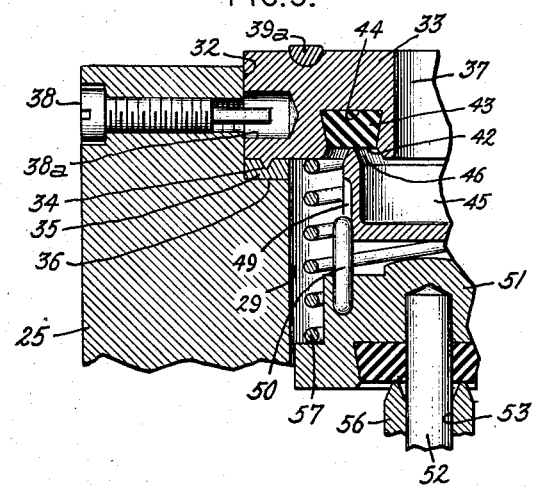
Fig. 5 is an enlarged fragmentary sectional view illustrating various elements of my valve in particular operating positions.

As clearly seen in Figs. 3, 4 and 5, the portion designated 46 of the member 45 is bevelled or formed as an edge which shall hereinafter be referred to as being substantially sharp. In this manner, the member 45 is provided with a sealing surface adapted for avoiding any accumulation thereon of foreign matter passing through the system that might tend to affect deleteriously the seal between the member 45 and the member 43 of the main valve seat. Any foreign matter that would tend to find its way to the sealing surface 46 would fall either into the valve chamber outside the member 45 or into the central portion of the member 45 where it would be incapable of adversely affecting the seal. Additionally, when the member 45 is held in sealing or valve closing engagement with the valve seat in the manner shown in Figs. 3 and 4, the substantially sharp edge of the sealing surface 46 tends to become embedded in the valve seat surface of the resilient member 43 tending to insure a highly satisfactory seal.

The sealing member 45 is formed to include a plurality of circumferentially spaced vertically extending recesses 49 in the sides thereof. By means of the recesses 49 the member 45 is adapted for being slidably positioned between a plurality of vertical guide pins 50. The guide pins 50 are securely fitted in the upper portion of a valve plunger head 51 and are effective for maintaining the sealing member 45 atop the valve plunger head in such manner that the sealing member 45 is movable relative to the plunger head between valve closing and opening positions when the plunger head is in the lowered position thereof shown in Fig. 5. As seen in Fig. 2 one of the guide pins 50 extends through the plunger head 51 slidably into elongated bore 50a. This arrangement avoids rotation of the plunger head and sealing member thereby to insure engagement of the same portions of the valve seat and sealing member each time the valve closes.

The plunger head 51 is securely fitted on the upper end of a valve stem 52 which extends in a vertically guided manner through a suitable axially extending bore 53 connecting the recess 26 in the bottom of the valve head and the bore 29 in the top portion of the valve head. The lower surface of the valve plunger head 51 is recessed about the upper portion of the stem 52 thereby to receive a secondary valve seal 54 formed preferably of the same material as the valve seat member 43. The secondary sealing member 54 is adapted for cooperating with an upstanding portion 56 of the valve head formed about the stem 52 thereby to afford a seal between the valve chamber and, the stem bore 53 when the valve head is in its lower position, in the manner shown in Fig. 5.

Fitted about the top portion of the plunger head 51 and the sealing member 45 is a coil spring 57. The coil spring 57 engages a laterally extending shoulder on the plunger head 51 and the under surface of the insert 33 and is effective for biasing the plunger head downwardly to the position thereof shown in Fig. 5.

As seen in Fig. 2, a seal is adapted for being provided by an O-ring 58 fitted about the lower end of the valve stem and positioned in a central recess 59 in the bottom of the recess 26. The O-ring is held in place by retainer 60 suitably secured and positioned by a plurality of machine screws 61 threaded into the valve head in the bottom of the recess 26.

The lower end of the valve stem 52 is adapted for engaging a solenoid cap 62 fitted on the end of the solenoid stem 27, thereby to provide cooperation between the valve stem and solenoid stem. The solenoid cap 62 is provided for enabling the positioning of one or more shims 63 between the valve and solenoid stems for the purpose of obtaining satisfactory spacing therebetween.

The solenoid stem 27 extends through the solenoid 20 and is fitted on the lower end thereof with a spring cap 64 adapted for cooperating with a coil spring 65 mounted in a spring support 66 suitably secured to the lower end of the solenoid 20.

The force constant or stiffness of spring 65 is greater than that of the spring 57 and when the solenoid 20 is deenergized the spring 65 is effective for overcoming effect of the spring 57 and for moving the solenoid stem 27 upwardly to the position shown in Fig. 2 whereby the valve stem 52 and the valve plunger head 51 are actuated upwardly for compressing the spring 57 and engaging the bottom of the sealing member 45 and moving the sealing edge 46 thereof upwardly into sealing engagement with the member 43 of the valve seat 42 in the manner shown in Figs. 2 and 3. Thus, the valve is positively closed when the solenoid 20 is deenergized. Upon subsequent energization of the solenoid, the solenoid stem 27 is attracted downwardly into the solenoid and the spring cap 64 secured to the lower end of the stem is effective for compressing the spring 65. Thus, the valve plunger head spring 57 is rendered effective for actuating the plunger head downwardly in the valve chamber to the position thereof shown in Fig. 5. When the plunger is in this lowered position it is effective for holding the secondary valve sealing member 54 in sealing engagement with the member 56 but it is ineffective for holding the edge 46 of the sealing member 45 in sealing engagement with the primary valve seat member 43.

Under these conditions the natural tendency would be for the sealing member 45 to fall of its own weight and follow the plunger head 51 for thereby opening the valve or, in other words, to permit communication between the inlet and outlet sides of the valve. However, as pointed out above, the sealing member 45 is formed of a substantially light material. Thus, the sealing member 45 is adapted for being held in sealing engagement with the valve seat member 43 by fluid pressure alone when certain pressure conditions exist across the valve 10. That is, if the pressure on the oil pump side of the system is sufficiently high relative to that on the vacuum side, it will overcome the weight of the sealing member 45 and hold it in the valve closing position in the manner shown in Fig. 5.

While I have shown and described my invention as including a solenoid adapted for moving the sealing member into valve closing engagement with the valve seat, other operating means could alternatively be employed. For instance, an air operated plunger could be effectively utilized in place of the solenoid.

The operation of the pumped ignitron rectifier system shown in the drawing and including the valve 10 will now be described for the purpose of bringing out more fully the advantages of the use of my valve 10 in the system. Due to the electrical connection of the solenoid 20 in the control circuit of the drive motor 14 of the vacuum pump 13, the solenoid 20 is adapted for being energized and effective for opening the valve during normal operation of the system. With the valve open the oil vacuum pump 13 is effective for exhausting the mercury diffusion pump 5 for effecting operation of the diffusion pump thereby to evacuate the rectifier tubes 1 through the vacuum manifold 3. Upon stopping of the oil pump motor for the purpose of shutdown of the system or due to a power failure, the solenoid 20 is de-energized whereby the spring 64 is effective for overcoming the spring 57 and moving the sealing member 45 into sealing engagement with the main valve seat 42 through the solenoid stem 27, the valve stem 52 and the plunger head 51. Thus the edge 46 of the sealing member 45 is held in the valve closing position of Figs. 2 and 3. During shutdown of the system for any reason the valve is closed in the just-described manner for avoiding contamination of the vacuum side of the system by oil vapor from the pump 13 or air leaking past the pump seals.

Subsequently, upon restarting of the oil pump motor 14, the solenoid 20 is energized for overcoming the stronger spring 65 and thereby enabling the weaker spring 57 to move the plunger head 51 downwardly in the valve chamber to the position thereof shown in Fig. 5. However, there is a tendency for fluid pressure to build up in the oil pump side of the system during shutdown due to vaporization of oil and leakage of air past the seals of the oil pump. If this pressure is sufficiently high the pressure difference existing across the valve will result in the sealing member 45 being held by fluid pressure in the sealing position thereof shown in Fig. 5 instead of following the plunger head 51 to its lower position. The sealing member 45 will continue to be held in this valve closing position by fluid or vapor pressure until the oil vacuum pump 13 is effective for sweeping out or evacuating the oil side of the system and thereby reducing the pressure difference across the valve to a valve where the member 45 is permitted to fall of his own weight and thereby open the connection between the vacuum and oil pumps side of the system. When the pressure is so reduced, the oil pump will have come up to the full operating speed and there is substantially no possibility of oil vapor or air entering into the vacuum side of the system.

The receiver tank 7, in addition to receiving any mercury vapor that might pass through the mercury diffusion pump 5, is effective for minimizing any adverse effect on the vacuum system of any air or oil vapor that may manage to get past the valve 10. That is, the receiver tank is substantially voluminous and in the event some air or oil vapor should get past the valve 10, it will be so widely dispersed or rarified in the receiver tank as to have only a minimal adverse effect on the vacuum side of the system.

Thus, it will be seen that I have provided a vacuum system adapted for operating in a manner to avoid contamination of the vacuum side thereof and including an automatic vacuum valve adapted for avoiding contamination of the vacuum system by maintaining the connection between the oil pump and vacuum sides of the system closed until the pump is effective for evacuating the oil pump side of the system so that no oil vapor or air will pass into the vacuum portion of the system when the valve is open. Additionally, my valve structure provides means for avoiding accumulation of matter on the sealing surface thereof, thereby to insure a satisfactory seal.

While I have shown and described a specific embodiment of my invention, I do not desire my invention to be limited to the particular form shown and described, and I intend by the appended claims to cover all modifications within the spirit and scope of my invention.

What I claim as new and desire to secure by Letters Patent of the United States is:

1. A vacuum system comprising; an evacuated portion, a vacuum pump, a valve connected between said pump and said evacuated portion of said system, said valve including a body portion having an aperture, a sealing member for said aperture, means responsive to the operation of said pump and effective for moving said sealing member to an aperture closing position upon stopping of said pump and effective for retaining said sealing member in said aperture closing position during operation of said pump, said sealing member being retainable in said aperture closing position by vacuum pressure in said system upon restarting of said pump and until a predetermined pressure condition exists across said aperture following which said sealing member is adapted for falling freely out of said aperture closing position.

2. A vacuum system comprising; an evacuated portion, a vacuum pump, a valve connected between said pump and said evacuated portion of said system, said valve including a body portion having an aperture, a sealing member for said aperture, and solenoid controlled means responsive to the operation of said pump and effective for moving said sealing member to an aperture closing position upon stopping of said pump and ineffective for retaining said sealing member in said aperture closing position during operation of said pump, said sealing member being retainable in said valve closing position by fluid pressure only upon restarting of said pump until a predetermined pressure condition exists across said aperture following which said sealing member is adapted for falling freely out of said aperture closing position.

3. A vacuum system comprising; an evacuated portion, a vacuum pump including a drive motor, a valve connected between said pump and said evacuated portion of said system, said valve including a body portion having an aperture, a valve seat formed about said aperture, a sealing member, actuating means engageable with said sealing member to actuate it to aperture closing engagement with said seat, means effective for biasing said actuating means into engagement with said sealing member to close said aperture upon stopping of said motor, and solenoid operated means energized during operation of said motor for overcoming said biasing means and moving said actuating means out of engagement with said sealing member and to an unobstructive position with respect to movement of said sealing member out of aperture closing engagement with said seat to permit opening of said aperture, said sealing member being retainable in said aperture closing position independently of said actuating means and by fluid pressure only until a predetermined pressure condition exists across said aperture following which said sealing member is adapted for falling freely out of said aperture closing engagement with said seat.

4. A pumped electric discharge device system comprising; at least one electric discharge device, a mercury diffusion pump for maintaining the pressure in said device within a predetermined operating range, an oil vacuum pump for reducing the pressure on said diffusion pump to effect operation of said diffusion pump, and a vacuum valve connected in said system between said pumps, said vacuum valve including a body portion having an aperture, a valve seat formed about said aperture, a sealing member engageable with said valve seat to close said valve, actuating means engageable with said sealing member and biased for actuating said sealing member into engagement with said valve seat to close said aperture when said oil vacuum pump is idle, and means effective during operation of said oil vacuum pump for overcoming the bias on said actuating means to permit opening of said aperture, said sealing member being of light construction and retainable in said aperture closing position against the force of gravity by fluid pressure alone after said biasing means has been overcome and until said oil vacuum pump is effective for evacuating the oil pump side of said system, thereby to avoid contamination of the vacuum side of said system.

5. A pumped electric discharge device system comprising; at least one electric discharge device, a mercury diffusion pump for maintaining the pressure in said device within a predetermined operating range, an oil vacuum pump including a drive motor, said oil vacuum pump being effective for reducing the pressure on said diffusion pump to effect operation of said diffusion pump, and a vacuum valve connected in said system between said pumps, said vacuum valve including a body portion having an aperture, a valve seat formed about said aperture, a discrete cupped sealing member, actuating means loosely associated with said sealing member and biased for engaging said sealing member and moving the edge thereof into engagement with said valve seat to close said aperture when said motor is idle, and solenoid operated means energized during operation of said motor for overcoming the bias on said actuating means and moving said actuating means to an unobstructive position with respect to movement of said sealing member to permit opening of said aperture, said sealing member being retainable in said aperture closing position by fluid pressure alone until said oil vacuum pump is effective for evacuating the oil pump side of said system, thereby to avoid contamination of the vacuum side of said system.

6. A pumped electric discharge device system comprising; at least one electric discharge device, a mercury diffusion pump for maintaining the pressure in said device within a predetermined operating range, an oil vacuum pump including a drive motor, said oil vacuum pump being effective for reducing the pressure on said diffusion pump to effect operation of said diffusion pump, and a vacuum valve connected in said system between said pumps, said vacuum valve including a body portion having an aperture, a resilient valve seat formed about said aperture, a discrete cupped sealing member, said cupped sealing member having a bevelled edge effective for avoiding accumulation thereon of matter that would tend adversely to affect a seal between said valve seat and sealing member, means biasing said edge of said cupped sealing member into engagement with said valve seat to close said aperture when said motor is idle, and solenoid operated means energized during operation of said motor for overcoming said biasing means and permitting free movement of said sealing member out of engagement with said seat, said sealing member being of light construction and retainable in said aperture closing position by fluid pressure alone until said oil vacuum pump is effective for evacuating the oil pump side of said system, thereby to avoid contamination of the vacuum side of said system.

7. A vacuum valve comprising a body portion having an aperture, a discrete sealing member for said aperture, actuating means engageable with said sealing member and biased for moving said sealing member to an aperture closing position, means operable for overcoming the bias on said actuating means and moving said actuating means out of engagement with said sealing member and to an unobstructive position with respect to movement of said sealing member out of said aperture closing position, and said sealing member being of sufficiently light construction to be retainable in said aperture closing position by vacuum pressure alone after said actuating means is moved out of engagement therewith and until a predetermined pressure condition exists across said aperture, following which said sealing member is adapted for falling out of said aperture closing position.

8. A vacuum valve comprising a body portion having an aperture, a discrete sealing member for said aperture, actuating means engageable with said sealing member and biased for moving said sealing member to an aperture closing position, solenoid-controlled means operative when energized for overcoming the bias on said actuating means and moving said actuating means out of engagement with and to an unobstructive position with respect to movement of said sealing member out of said aperture closing position, and said sealing member being of sufficiently light construction to be retainable in said aperture closing position by vacuum pressure alone after said actuating means is moved out of engagement therewith and until a predetermined pressure condition exists across said aperture, following which said sealing member is adapted for falling out of said aperture closing position.

9. A vacuum valve comprising a body portion having an aperture, a valve seat about said aperture, a discrete cup-like sealing member having a rim engageable with said seat, actuating means loosely associated with said sealing member and engageable therewith, said actuating means being biased for engaging and moving said sealing member into engagement with said seat to close said aperture, means operable for overcoming the bias on said actuating means and moving said actuating means out of engagement with said sealing member and to an unobstructive position with respect to movement of said sealing member out of engagement with said seat, and said sealing member being of sufficiently light construction to be retainable in said aperture closing position by vacuum pressure alone after said actuating means is moved out of engagement therewith and until a predetermined pressure condition exists across said aperture, following which said sealing member is adapted for falling out of said aperture closing position.

10. A vacuum valve comprising a body portion having an aperture, a resilient valve seat about said aperture, a discrete cup-like sealing member having a rigid rim engageable with said seat, a bevelled edge on said rim effective for avoiding accumulations thereon of matter that would tend adversely to affect a seal between said seat and sealing member, actuating means engageable with said sealing member and biased for moving said sealing member to an aperture closing position, solenoid operated means effective when energized for overcoming the bias on said actuating means and moving said actuating means out of engagement with said sealing member and to an unobstructive position with respect to movement of said sealing member out of engagement with said seat, and said sealing member being of sufficiently light construction to be retainable in said aperture closing position by vacuum pressure alone after said actuating means is moved out of engagement therewith and until a predetermined pressure condition exists across said aperture, following which said sealing member is adapted for falling out of said aperture closing position.

11. A vacuum valve comprising a body portion having an aperture, a discrete sealing member for said aperture, actuating means engageable with said sealing member, a first biasing means normally biasing said actuating means to engage said sealing member and actuate it to an aperture closing position, means operable for overcoming said first biasing means, a second biasing means effective when said first biasing means has been overcome for moving said actuating means out of engagement with said sealing means and to an unobstructive position with respect to movement of said sealing means out of said aperture closing position, and said sealing member being of sufficiently light construction to be retainable in said aperture closing position by vacuum pressure alone after said actuating means is moved out of engagement therewith and until a predetermined pressure condition exists across the aperture, following which said sealing member is adapted for falling out of said aperture closing position.

12. A vacuum valve comprising a body portion having an aperture, a resilient valve seat about said aperture, a discrete cup-shape sealing member having a rigid rim engageable with said seat, a bevelled edge on said rim effective for avoiding accumulations thereon of matter that would tend adversely to affect a seal between said seat and rim, a plunger loosely coupled to said sealing member and engageable therewith to move said sealing member to an aperture closing position, a first spring normally biasing said plunger to engage said sealing member and actuate it to said aperture closing position, a solenoid effective when energized to overcome the biasing effect of said first spring, a second spring effective when said first spring is overcome for biasing said plunger out of engagement with said sealing member and to an unobstructive position with respect to movement of said sealing member out of said aperture closing position, and said sealing member being of sufficiently light construction to be retainable in said aperture closing position by vacuum pressure alone after said actuating means is moved out of engagement therewith and until a predetermined pressure condition exists across said aperture, following which said sealing member is adapted for falling out of said aperture closing position.

References Cited in the file of this patent

UNITED STATES PATENTS

| | | |
|---|---|---|
| 2,063,665 | Edwards | Dec. 8, 1936 |
| 2,215,906 | Kaegi | Sept. 24, 1940 |
| 2,331,896 | Durand | Oct. 19, 1943 |
| 2,333,010 | Hyodo | Oct. 26, 1943 |
| 2,374,205 | Hoskins | Apr. 24, 1945 |
| 2,521,308 | Porter | Sept. 5, 1950 |
| 2,543,010 | Gardner | Feb. 27, 1951 |